United States Patent [19]

Korth

[11] 4,449,782
[45] May 22, 1984

[54] MODULAR, OPTICAL FIBER COMMUNICATION SYSTEM

[75] Inventor: Hans-Erdmann Korth, Stuttgart, Fed. Rep. of Germany

[73] Assignee: International Business Machines Corporation, Armonk, N.Y.

[21] Appl. No.: 258,990

[22] Filed: Apr. 30, 1981

[30] Foreign Application Priority Data

May 24, 1980 [DE] Fed. Rep. of Germany ....... 3019956

[51] Int. Cl.$^3$ ............................................... G02B 5/14
[52] U.S. Cl. .............................. 350/96.16; 350/96.18; 350/96.19; 370/3
[58] Field of Search ............... 350/96.15, 96.16, 96.17, 350/96.18, 96.19, 96.20, 164, 166; 370/3; 455/612

[56] References Cited

U.S. PATENT DOCUMENTS

| | | | |
|---|---|---|---|
| 4,198,117 | 4/1980 | Kobayashi | 350/96.19 |
| 4,274,705 | 6/1981 | Miller | 350/96.15 |
| 4,274,706 | 6/1981 | Tangonan | 350/96.19 |
| 4,289,373 | 9/1981 | Sugimoto et al. | 350/96.16 |
| 4,329,017 | 5/1982 | Kapany et al. | 350/96.15 |

FOREIGN PATENT DOCUMENTS 54-3554   1/1979   Japan ............................ 350/96.18

OTHER PUBLICATIONS

Kobayashi et al., "Micro-Optics Devices for Branching . . . ," *Int'l. Conf. on Int. Optics and O. F. Commun.-Tech. Digest*, Tokyo, Jul. 1977, pp. 367–370.

*Primary Examiner*—John D. Lee
*Attorney, Agent, or Firm*—Gerald R. Woods

[57] ABSTRACT

Low loss optical couplers for an optical data bus include a first component having permanent input/output connections to the bus and a reference face capable of reflecting energy from the input to the output. If optical energy is to be coupled into or out of the bus, a second component is secured to the first component. The second component has input and/or output optical connections and a reference face which contacts at least part of the reference face of the first component and which permits optical energy to be transferred between the two components. Frequency-selective encoders and decoders using active optical devices are also disclosed.

8 Claims, 14 Drawing Figures

U.S. Patent  May 22, 1984  Sheet 1 of 2  4,449,782
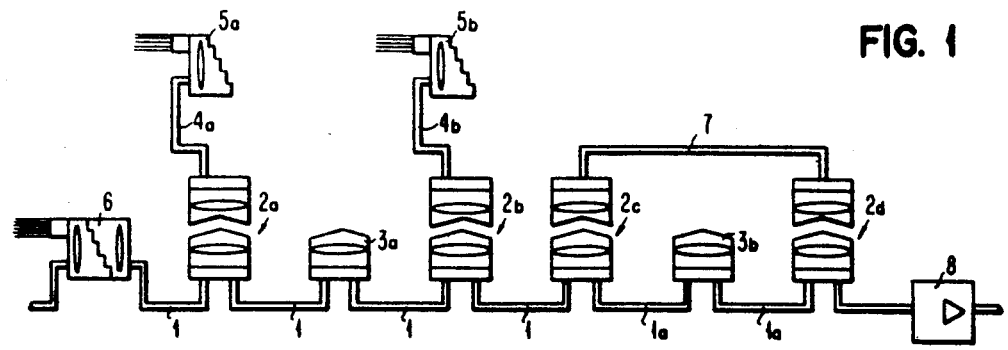
FIG. 1
FIG. 8 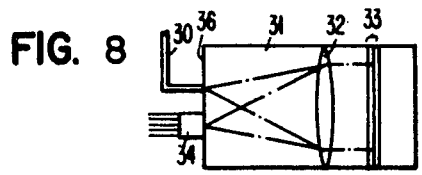 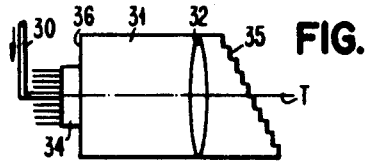 FIG. 9
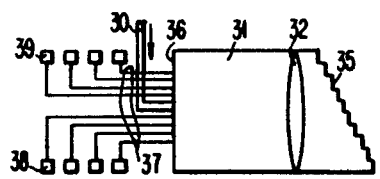 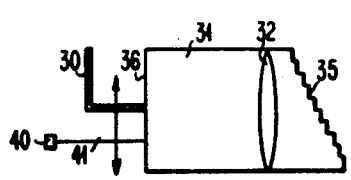
FIG. 10  FIG. 11
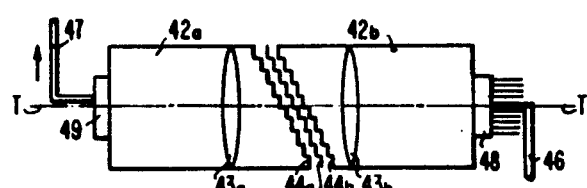
FIG. 12
FIG. 13  FIG. 14
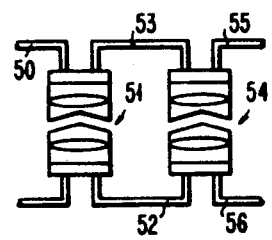 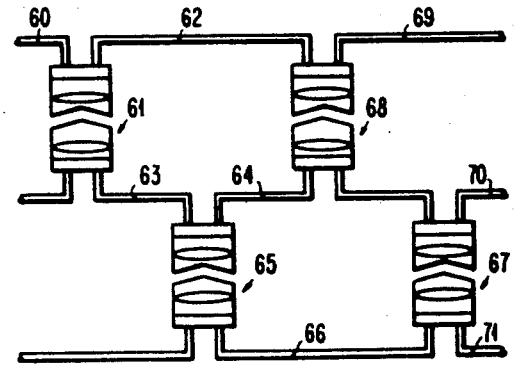

MODULAR, OPTICAL FIBER COMMUNICATION SYSTEM

TECHNICAL FIELD

The present invention relates to an optical communication system and more particularly to a highly modular optical fiber communication system.

Optical data transmission using light wave guides, so-called optical fibers, has become increasingly important because of the potentially high bandwidth, the low attenuation now obtainable and the decreasing manufacturing costs for such fibers. The possible range of applications is very wide, extending from remote transmission (telephone, data, television) to internal information transmission in closed systems (in a factory for process control, as a connecting cable in computers, etc.). In severe ambient conditions, for example, data transmission in a factory or in an automobile, optical information transmission offers the advantage of being less prone to electromagnetic interference.

BACKGROUND ART

In conventional electrical transmission systems, the use of a signal bus is often desirable, in particular for local transmission with many connecting points. For this purpose, the individual transmitter and receiver stations are connected to a single transmission channel, the bus. The number of connectable units is not determined by the structure of the transmission path but only by its capacity to carry data in electrical form. As a result, signal bus systems offer a high degree of flexibility with regard to future changes or extensions. For many applications it is expedient to design the bus as a closed ring or loop.

In electrical systems the bus can be operated either in a time multiplex mode or a frequency multiplex mode. In the former mode, the bus is assigned to each connected unit during a particular time slot. In the latter mode, each connected unit transmits information to or receives information from the bus at allocated frequencies.

In the field of optical data transmission, a light wave guide with its very high transmission capacity is basically suitable as a bus, since there can be a great number of broad-band single channels. Owing to the limited modulation capability of known light transmitters and receivers (up to about $10^8$ cps), the frequency multiplex method would be advantageous for light wave guides.

However, if it is to be realized, an optical broad-band communication system with frequency coding requires couplers (for connections, branches, taps, etc.) as well as optical frequency coders of maximum bandwidth. These are not yet available.

Although an optical transmission channel with light guides and frequency multiplexing has been proposed (German Offenlegungsschrift No. 25 01 791), the transmitter and receiver are at the end of the optical fiber instead of being distributed at arbitrary connecting points along said fiber, as would be necessary for a true bus system.

The known optical fiber transmission systems operate in accordance with a single channel principle, using only one wavelength. Direct connections via optical fibers are arranged between transmitter and receiver or operations proceed in a time multiplex mode. U.S. Pat. No. 3,953,727 discloses an example of an optical time-multiplexed system. In such systems, the greatest part of the theoretical bandwidth of the optical transmission medium remains unutilized.

To provide a modular optical communication system which can be realized in practice, the following requirements have to be met:

(1) Simple coupling to the optical bus.

The connecting points for the individual connectable units must be arbitrarily definable along the light wave guide. The elements necessary for coupling the light in and out of the bus must be as simple, small and light as possible.

(2) Independence of different transmissions.

Data transmission in a particular wavelength range must be possible between two or several connections without interfering with other transmissions.

(3) Modularity.

The individual components must be strictly modular and be exchangeable without alignment.

(4) Directionality.

Transmission must be possible in both directions; couplers with and without directionality are required.

(5) Fail Safeness.

In a system with a great number of connections, care must be taken that failure of individual components does not affect the system. For example, the introduction of a new connection must not interfere with normal operation. In the case of maintenance work, it should be possible to bridge partial segments of the transmission path without adversely affecting the remainder of the bus.

(6) Low losses.

All optical components used must have very low optical losses to permit great distances between the refresh amplifiers. Connections which are temporarily not occupied by a device must not degrade transmission.

SUMMARY OF THE INVENTION

It is an object of the present invention to provide a modular, optical fiber communication system operating in accordance with the bus principle, which has a great transmission bandwidth, is flexible and expandable, and which can be realized by means of simple elements.

To provide an optical transmission system operating in a frequency multiplex mode, dependent, pluggable couplers are used to couple individual channels (frequencies) or whole transmission bands into or out of an optical transmission line or fiber without significant losses. The couplers are self-collimating, optical components by means of which the light exiting from the connected fiber is passed on to a connected unit as a function of the wavelength. In the absence of a connected unit, the coupler reflects light back to the fiber. For wavelength-dependent coding and decoding, dispersive elements are inserted into these self-collimating, optical components. With the aid of such pluggable connectors, devices can be readily connected to the optical transmission line. The connectors also permit branching or bridging in the optical transmission line.

In addition to the great transmission bandwidth, the optical frequency multiplex method has the advantage that broad band refreshing amplification can be effected by means of color lasers. There is no need for elaborate pulse amplification (with subsequent pulse reshaping).

BRIEF DESCRIPTION OF THE DRAWINGS

A preferred mode for practicing the invention is described below with reference to drawings in which:

FIG. 1 is a schematic of a modular, optical fiber communication system with couplers and frequency coders;

FIG. 8 is a color coder for coupling a particular wavelength into or out of the optical bus with a narrow band interference filter;

FIG. 9 is a color coder with an echelon as a dispersive element and a linear arrangement of LEDs and photodiodes, respectively;

FIG. 10 is a color coder with an echelon and electro-optical transducers connected via optical fibers;

FIG. 11 is a color coder with adjustable wavelength;

FIG. 12 is a color coder with a dielectric reflection grating, which can be directly integrated into an optical transmission line;

FIGS. 13 and 14 are fail safe optical fiber transmission systems.

FIG. 1 is a schematic of a section of an optical fiber communication system operating in a frequency multiplex mode. An optical fiber 1 carries frequency-encoded information destined for one or several of the connected units. Pluggable couplers are connected to the optical fiber. Optical signals can be transmitted out of the fiber 1 at these couplers by introducing an optical plug into the coupler. Reference numbers 2a, 2b, 2c and 2d refer to couplers which are optically connected to the optical fiber, thus causing part of the light carried by the bus to be coupled out. Reference numbers 3a, 3b refer to couplers into which no plug is introduced and in which there is no coupling out. The optical loss at such unused couplers should be zero in the ideal case. For refreshing the light transferred in the optical fiber 1, a broad band optical amplifier 8, such as a dye laser, is used.

Figure 2:
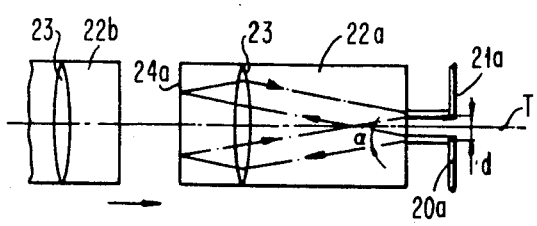
FIG. 2 is a schematic of a self-collimating, optical coupler for an optical bus.

Transfer of optical energy to or from the fiber 1 at a particular frequency or frequency band is effected by means of color coders. Reference numbers 5a, 5b refer to color coders which are connected to the optical fiber via branch lines (optical fibers) 4a, 4b and couplers 2a, 2b. Reference number 6 refers to a color coder which can be directly included in the light path of the optical fiber 1.

Couplers 2c and 2d are connected to each other via an optical fiber 7 to bridge segments 1a and 1b of the optical transmission line for maintenance purposes.

If optical energy in particular frequency bands are to reach only particular sections of the optical fiber 1, this can be controlled by means of band filters which are combined, for example, with an unused coupler 3a.

FIGS. 2-7 show different embodiments of the self-collimating couplers which can be used to connect fibers or external units to the optical fibers. The principle of a self-collimating coupler is shown in FIG. 2. The dash-dotted lines represent the beam paths in a highly simplified form.

The coupler consists of two, essentially complementary halves, one half 22a of which is permanently attached to the optical bus at a required connecting point. For connection, the second half (designated as 22b) is plugged into the permanently attached half. Complementary parts of the two halves bear the same reference numbers with a and b suffixes, respectively. Other parts are identified by a number with an a or b suffix to indicate which half it is in, even where there is no corresponding complementary part in the other half. The permanently included half of a coupler consists of a base 22a to which two optical fibers 20a, 21a are connected symmetrically to the center axis T at a small spacing d. The optical fibers 20a, 21a represent the optical bus and carry the input signal. The light exiting from fiber 20a at an effective aperture cone a is applied, via an imaging element 23a, e.g., a lens, to reference face 24a, at which it is reflected and focussed at the entry of the optical fiber 21a via the imaging element 23a. The base 22a of the coupler is preferably designed as a compact transparent block, such optical components can be produced cheaply, and nevertheless at a high degree of precision, from transparent plastics. The dimensions of the base 22a need be only several cm, so that an optical component which is easy to handle is obtained. The individual parts of such a component can be immovably positioned during casting, thus eliminating alignment problems. The optical loss in such a component can be reduced to a minimum.

For transferring optical energy out of the coupler, the reflection at the reference face 24a is circumvented by bringing a reference face 24b on second half 22b into contact with face 24a or by optically connecting the two halves through an immersion liquid.

Figure 3:
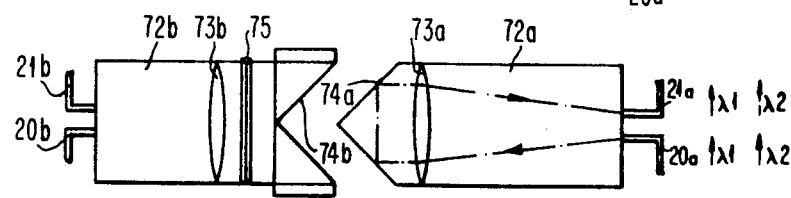
FIG. 3 is a self-collimating, optical coupler with a roof prism in the disconnected state.
Figure 4:
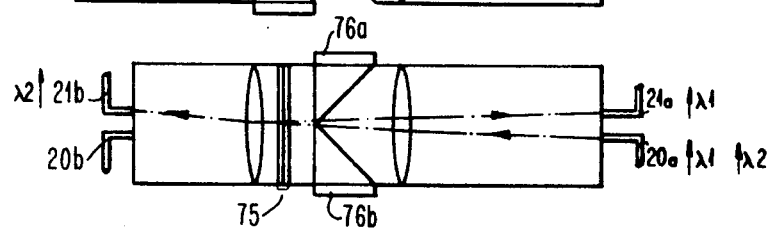
FIG. 4 is the roof coupler of FIG. 3 in the connected state.

FIGS. 3 and 4 show a favorable embodiment of a complete optical coupler in accordance with the principle of FIG. 2. The coupler concerned is a multi-purpose plug, the two components of which are compact plastic blocks comprising different optical elements. FIG. 3 shows the plug in the disconnected state, while FIG. 4 shows the two connected plug halves.

The reference face 74a of the plug section 72a connected to the optical transmission line 20a, 21a takes the form of a roof prism with a vertex angle of 90. The light with the wavelengths 1, 2 entering part 72a of the coupler from fiber 20a reaches fiber 21a of the optical bus practically without loss after it has been totally reflected twice at the roof prism 74a. The distance of lens 73a from the connecting points of the fibers 20a, 21a corresponds to their focal length.

After the counterpiece 72b with an inverse roof prism 74b has been connected, total reflection at roof prism 74a is avoided, allowing light to reach the exit fiber 21b via the imaging element 73b. The exit fiber 20b is not used in this operating mode.

Where only a particular narrow frequency range is to be coupled out of the optical transmission line, the counterpiece 72b is provided with an optical bandfilter 75 (e.g., an interference filter). This filter passes only the required wavelengths (e.g., 2, the remaining wavelengths (e.g., 1) being reflected and returned to the optical transmission line 21a.

To avoid optical losses when the counterpiece 72b is connected to the roof prism, mirrors 76a, 76b may be provided on counterpiece 72b in the area of the inverse roof prism 74b.

Figure 5:
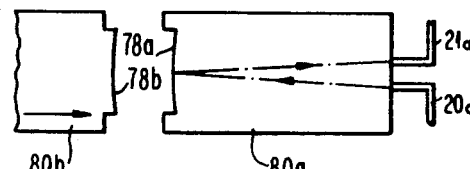
FIG. 5 is a self-collimating coupler including an integrated, optical lens.

FIG. 5 is a schematic of a self-collimating, optical coupler, the reference face 78a of which also has imaging characteristics; that is, an integrated lens. The face 78b on counterpiece 80b is complementary to the outer shape of face 78a. This embodiment is particularly suitable if the coupler is to be manufactured from a precision plastic component. In the disconnected state of this coupler, the reference face 78a may be provided with a reflecting cladding.

Figure 6:
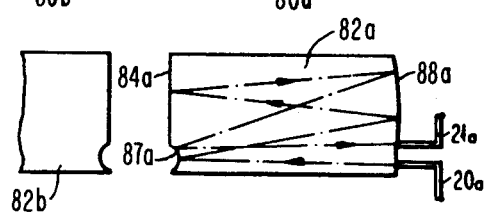
FIG. 6 is an optical coupler having concave mirrors and an extra axial beam path.

In FIG. 6, two spherical mirrors 87a, 88a are used as imaging elements in an arrangement with an eccentric beam path. Mirror 87a, as a convex mirror, is arranged opposite the connection of the optical fibers 20a, 21a, reflecting the entering light at a concave mirror 88a, by means of which the beam is directed in parallel on to the reference face 84a where it is reflected and whence it reaches the counterpiece 82b of the coupler, respectively.

Figure 7:
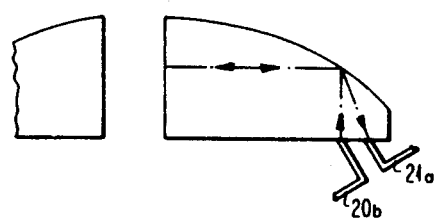
FIG. 7 is a self-collimating coupler including a paraboloid of revolution.

In FIG. 7 the two halves of the coupler consist of paraboloids of revolution to which the optical fibers 20a, 21a are connected in the vicinity of their focal points. Details of this embodiment are described in the simultaneously filed U.S. patent application Ser. No. 258,868.

The reference faces of the couplers in accordance with FIGS. 6 and 7 can be provided with a reflecting cladding in the disconnected state of the plug or be designed as a roof prism with total reflection.

FIGS. 8–12 show different embodiments of arrangements for optical frequency multiplexing. These can be derived from the self-collimating couplers in FIGS. 3–7 and are obtained by applying a wavelength selective component to the reference face of the permanently attached half.

In FIG. 8 a multi-layer interference filter 33 is used as a dispersing element. The light entering the coupler 31 from fiber 30 is converted into a parallel beam by means of a lens 32. Wavelength-selective reflection occurs at interference filter 33. The reflected light is focussed by lens 32 on to output 34 where further optical fibers or active optical devices such as photo sensitive elements may be connected.

In FIGS. 9–11, an echelon 35 is used as a dispersing element. The connecting element 31 is connected to the optical fiber 30 in the plane of symmetry T. The light exiting from fiber 30 is spread by the echelon symmetrically to the plane of symmetry in accordance with wavelengths and may be recorded by photoreceivers arranged at suitable points of the connecting plane 36 of the coupler 31. In this manner the frequency components of the optical signal received through the optical fiber 30 are separated for decoding.

If, on the other hand, a particular narrow frequency band is to be fed from a light source into the optical fiber 30, this can be effected by reversing the light path previously described. If active optical devices, such as light sources, are arranged at the points of the plane 36 which correspond to the desired frequency band, dispersion at the reflection grating 35 causes only the desired section of the spectrum of such light sources to be fed to the optical fiber 30. In such an operating mode the elements in accordance with FIGS. 9 to 11 operate as optical frequency coders.

Photoreceivers or light sources may be connected to the elements shown in FIGS. 8 to 11 in various ways. FIG. 9 shows an integrated linear arrangement 34 of photodetectors and/or light sources (e.g., LEDs) which are mounted symmetrically to the connecting point of the optical fiber 30. The upper half of this arrangement, for example, may be designed as a photodetector series and the lower half as an LED series.

In FIG. 10 discrete opto-electronic components 38, 39 (photodiodes) and LEDs are used which are connected to the plane 36 of the connecting element 31 via individual optical fibers 37.

FIG. 11 shows a tunable element to which an electro-optical transducer 40 is connected via an optical fiber 41; the connecting point of the optical fiber 41 on face 36 is mechanically adjustable; in this manner the wavelength required may be determined by mechanical displacement.

All embodiments of the band filters and the optical coders/decoders shown in FIGS. 8–11 are preferably produced as compact blocks of precision plastic parts. The elements shown in FIGS. 9 to 11 correspond to the channel coders 5 in FIG. 1. The filter shown in FIG. 8 may be used as a band filter 3a in FIG. 1.

FIG. 12 shows an optical frequency coder/decoder which may be directly included in the optical transmission line. This corresponds to element 6 in FIG. 1. This element consists of two halves 42a, 42b which, also in this case, may take the form of precision plastic parts. Each half includes a lens 43a, 43b. The adjacent faces of the two halves consist of engaging reflection gratings 44a, 44b between which a step-shaped dielectric multi-layer arrangement 45 (an interference filter) may be optionally arranged. Fibers 46, 47 of the optical bus are arranged on the parallel end faces of the coding element preferably at its axis of symmetry T.

The interference filter passes optical energy in the preferred band to the exit fiber 47 while suppressing optical energy outside of this band. In the absence of an interference filter, light at all frequencies in the input signal reaches the exit fiber 47, since the two echelons cause no relative phase shifting of the passing light.

In contrast to this, the light reflected at reflection grating 44b is split and can be measured according to wavelengths by photoreceivers 48 arranged in the connecting plane of the optical fiber 46. In place of the photoreceivers, further optical fibers may be connected. For feeding selectively determined wavelengths to fiber 46, it is also possible to use luminescense diodes in place of the photoreceivers 48; if the optical transmission line is to be operated with directionality (i.e., in only one direction), luminescence diodes 49 on the connecting face of the exit fiber 47 serve to feed selective wavelengths to the optical fiber.

The couplers illustrated in FIGS. 2–7 can be used to provide meshed optical transmission systems which are protected against failure of individual components. In this case, the couplers are operated as beam splitters in which reflection at the reference face is only partly and not completely eliminated. The splitting ratio can be adjusted over a wide range, for example, by maintaining a defined spacing between the two reference faces or by interposing a medium with a suitable selected refractive index.

FIG. 13 shows a transmission network with such beam splitters, which renders a transmission line between two nodes 51 and 54 fail safe. For this purpose, part of the light arriving via the optical fiber 50 is fed to optical fiber 53 by being reflected at the boundary surface of coupler 51 and another part to line 52 by being transmitted in coupler 51. As a result, a signal can be tapped at each exit fiber 55, 56 even if fiber 52 or 53 fails.

FIG. 14 shows an example of a further meshed network which protects against power failure as well as failure of a coupler. A signal can be tapped at least on one of the output lines 69, 70, 71 if one of the lines 62, 63, 64 or 66 fails or one of the couplers 65, 68 is subject to interference affecting its transmission, reflection or both.

Having thus described my invention with reference to a preferred embodiment thereof, variations and modifications will be evident to those of skill in the art. Hence, it is desired that what is described by the following claims be taken by way of illustration, not limitation.

Having thus described my invention with reference to a preferred embodiment therein, what I claim and desire to protect by Letters Patent is:

1. For use in an optical communication system including an optical fiber bus, a self-collimating coupler for selectively coupling energy into or out of the bus, said coupler including:
   a first component having an optical input from the bus, an optical output to the bus, and a reference fare capable of reflecting input optical energy to the output, said first component being permanently coupled to the bus;
   a second removable component having an optical output and a reference face, said second component being capable of being retained with at least a portion of its reference face in contact with the reference face of said first component, whereby optical energy applied at the input to said first component is coupled through both reference faces to the output from said second component.

2. A coupler as recited in claim 1, wherein the optical connections to and the reference face of said first component are symmetrical about a central axis through said component.

3. A coupler as recited in claim 2 wherein the reference faces of said first component and said second component have complementary configurations.

4. A coupler as recited in claim 3 wherein each of said components consists of a transparent block having an imaging element therein.

5. A coupler as recited in claim 4 wherein the reference face of said first component comprises a protruding roof prism having its vertex on the central axis of said component while the reference face of said second component comprises a prism-shaped recess.

6. A coupler as recited in claim 4 wherein said second component further includes a frequency-selective element for allowing only selected bands of optical energy to be transmitted to its optical output.

7. A coupler as recited in claim 6 wherein said frequency-selective element comprises an interference filter.

8. A coupler as recited in claim 1 wherein the reference faces of said first and said second components include a concave spherical mirror while the input and output connections to said first component are eccentric with respect to a central axis through said first component.

* * * * *